United States Patent
Morita et al.

(10) Patent No.: US 12,103,082 B2
(45) Date of Patent: Oct. 1, 2024

(54) METHOD FOR PRODUCING GREEN COMPACT AND METHOD FOR PRODUCING SINTERED BODY

(71) Applicant: Toho Titanium Co., Ltd., Kanagawa (JP)

(72) Inventors: Masahiro Morita, Kanagawa (JP); Masashi Hayakawa, Kanagawa (JP); Yosuke Inoue, Kanagawa (JP); Hideki Fujii, Kanagawa (JP)

(73) Assignee: Toho Titanium Co., Ltd., Kanagawa (JP)

( * ) Notice: Subject to any disclaimer, the term of this patent is extended or adjusted under 35 U.S.C. 154(b) by 230 days.

(21) Appl. No.: 17/631,073

(22) PCT Filed: Sep. 24, 2020

(86) PCT No.: PCT/JP2020/035996
§ 371 (c)(1),
(2) Date: Jan. 28, 2022

(87) PCT Pub. No.: WO2021/060363
PCT Pub. Date: Apr. 1, 2021

(65) Prior Publication Data
US 2022/0274167 A1   Sep. 1, 2022

(30) Foreign Application Priority Data
Sep. 27, 2019  (JP) ................ 2019-177836

(51) Int. Cl.
*B22F 3/15*  (2006.01)
*B22F 1/05*  (2022.01)
(Continued)

(52) U.S. Cl.
CPC .............. *B22F 3/15* (2013.01); *B22F 1/05* (2022.01); *B22F 3/04* (2013.01);
(Continued)

(58) Field of Classification Search
CPC ..................... B22F 3/04; B22F 2301/205
See application file for complete search history.

(56) References Cited

U.S. PATENT DOCUMENTS

| | | | | |
|---|---|---|---|---|
| 4,999,157 A * | 3/1991 | Nishio | ............... | B22F 3/1233 |
| | | | | 425/405.2 |
| 5,066,454 A | 11/1991 | Hanson | | |
| 2020/0016661 A1 * | 1/2020 | Clark | ................ | B22F 5/08 |

FOREIGN PATENT DOCUMENTS

| BE | 896207 A | 7/1983 |
|---|---|---|
| JP | H06-33165 A | 2/1994 |

(Continued)

OTHER PUBLICATIONS

JP-H08-300195-A English language translation (Year: 1996).*
(Continued)

*Primary Examiner* — Sally A Merkling
*Assistant Examiner* — Sean P. O'Keefe
(74) *Attorney, Agent, or Firm* — MARSHALL, GERSTEIN & BORUN LLP

(57) ABSTRACT

A method for producing a metallic green compact 61 relates to a method for producing the green compact 61 having at least one recess 62, including a step of subjecting a raw material powder filled in a resin mold 1 to cold isostatic pressing while placing a resin core material 11 having a shape corresponding to the recess 62 at a position corresponding to the recess 62 in the resin mold 1.

11 Claims, 10 Drawing Sheets

(51) Int. Cl.
*B22F 3/04* (2006.01)
*B33Y 80/00* (2015.01)
(52) U.S. Cl.
CPC ..... *B22F 2301/205* (2013.01); *B22F 2304/10* (2013.01); *B33Y 80/00* (2014.12)

(56) References Cited

FOREIGN PATENT DOCUMENTS

| | | |
|---|---|---|
| JP | H08-300195 A | 11/1996 |
| JP | H09-38939 A | 2/1997 |
| JP | H09-323308 A | 12/1997 |
| JP | 2001-131605 A | 5/2001 |
| JP | 2003-088996 A | 3/2003 |
| JP | 2003-305593 A | 10/2003 |
| JP | 2011-251341 A | 12/2011 |
| WO | WO-2019/054303 A1 | 3/2019 |
| WO | WO-2019/054306 A1 | 3/2019 |

OTHER PUBLICATIONS

WO 2019054306 A1 English language translation (Year: 2019).*
Search Report in International Application No. PCT/JP2020/035996 dated Dec. 1, 2020, 4 pages.
Extended European Search Report in EP Application No. 20869804.3 dated Nov. 22, 2022, 11 pages.
International Preliminary Report on Patentability and Written Opinion in International Application No. PCT/JP2020/035996 dated Apr. 7, 2022, 7 pages.
Office Action in CN Application No. 202080056745.3 dated Sep. 5, 2023, 7 pages.

* cited by examiner

METHOD FOR PRODUCING GREEN COMPACT AND METHOD FOR PRODUCING SINTERED BODY

FIELD OF THE INVENTION

This invention relates to a method for producing a green compact and a method for producing a sintered body.

BACKGROUND OF THE INVENTION

For example, titanium and titanium alloys have been studied for use in various parts because of their excellent properties such as fatigue resistance, corrosion resistance, light weight and high specific strength.

However, production of a part made of titanium or a titanium alloy requires a number of steps such as melting by electron beam melting or vacuum arc melting, casting, and in some cases, hot rolling, a heat treatment, machining, welding, and the like, and production costs increase accordingly. Due to such higher costs, it is cannot be said that an applicable range of the titanium-containing material is sufficiently expanded.

Under such circumstances, in recent years, a powder metallurgy method as a so-called near net shape is attracting attention, which fills raw material powder containing titanium in a resin mold, and subjecting the raw material powder to cold isotropic pressing to obtain a titanium-based green compact having a certain shape. In the powder metallurgy method, after the cold isotropic pressing, sintering and/or hot isotropic pressing may optionally be performed to increase the density.

As a technique relating to the method, Patent Literature 1 describes "a method for producing a compression molded body, comprising pressurizing a rubber mold filled with raw material powder in a uniaxial direction in the mold to form a compression molded product of the raw material powder, wherein a part of an outer surface of the compression molded body in a direction substantially perpendicular to the pressurizing direction is formed by a high-rigidity mold member arranged in the rubber mold".

Further, Patent Literature 2 proposes "a method for producing a sintered titanium alloy by a raw powder mixing method, wherein the method uses, in place of titanium powder, a powder obtained by blending titanium powder and (Ti—H) alloy powder and hydrogenated titanium powder so that a mass ratio of hydrogen: titanium is 0.002 or more and less than 0.030, as a raw material powder".

The powder metallurgy method as described above can be used not only for titanium and titanium alloys but also for various pure metals and alloy materials.

CITATION LIST

Patent Literatures

[Patent Literature 1] Japanese Patent Application Publication No. 2001-131605 A
[Patent Literature 2] Japanese Patent Application Publication No. H06-33165 A

SUMMARY OF THE INVENTION

Technical Problem

In order to produce a green compact having a recess such as a through hole or a non-through depression by the powder metallurgy method, a core material such as a core may be placed at a portion of the resin mold corresponding to the recess, and the raw material powder filled in the mold may be subjected to cold isostatic pressing. As such a core material such as a core, Patent Literature 1 uses a highly rigid core which is a cylindrical member made of steel (see paragraph 0035).

However, the use of the highly rigid core made of steel or the like as described in Patent Literature 1 causes a problem that the surface of the green compact obtained after cold isostatic pressing is raised in the vicinity of the highly rigid core, and the compact is not formed into a desired shape.

An object of this invention is to provide a method for producing a green compact and a method for producing a sintered body, which can suppress generation of a raised portion on a surface of the compact near a core material when forming the green compact having a recess by cold isostatic pressing.

Solution to Problem

As a result of intensive study, the present inventors have found that the generation of the raised portion on the surface of the green compact can be suppressed by using a resin core material together with the resin mold in cold isostatic pressing. This may be due to the following reasons. When the resin core material is used, the resin core material is elastically deformed during pressing, and the pressure is properly transmitted to the raw material powder, so that the entire raw material powder including the surroundings of the core material is sufficiently compacted. Also, after unloading, the resin core is restored so that it comes out of the recess and has no adverse effect on the green compact. It is expected that this will prevent the formation of the partially raised portion on the surface of the compact. However, this invention is not limited to such a theory.

Based on the above findings, this invention provides a method for producing a metallic green compact having at least one recess, comprising a step of subjecting a raw material powder filled in a resin mold to cold isostatic pressing while placing a resin core material having a shape corresponding to the recess at a position corresponding to the recess in the resin mold.

The method for producing the green compact according to this invention preferably uses, as the core material, a core material made of a resin material having a stress of 0.3 MPa to 3.5 MPa at a 20% strain in a uniaxial compression test.

In the method of producing the green compact, it is preferable that the core material comprises at least one selected from the group consisting of silicone resins and fluoro resins.

Also, in the method for producing the green compact according to this invention, it is preferable to use a mold made of a thermoplastic resin having a Shore D hardness in a range of from 30 to 120 as the mold.

In the method for producing the green compact according to this invention, the cold isostatic pressing can be carried out while the core material, as a separate member from the mold, is placed at a position corresponding to the recess of the mold, with a wall of the mold sandwiched between the core material and the raw material powder.

Alternatively, the method for producing the green compact according to this invention can use the mold integrally formed with the core material.

The above recess may be in a form of a non-through depression.

As the above green compact, for example, a titanium-based green compact made of titanium or a titanium alloy is produced. Alternatively, as the above green compact, for example, an iron-based compact made of iron or an iron alloy is produced.

The method for producing a sintered body according to this invention is a method for producing a sintered body, comprising a step of subjecting the green compact produced by any of the above methods for producing the green compact to sintering and/or hot isostatic pressing.

Advantageous Effects of Invention

According to the method for producing the green compact of this invention, it is possible to provide a method for producing a green compact and a method for producing a sintered body, which can suppress generation of a raised portion on a surface of the compact near a core material when forming the green compact having a recess portion by cold isostatic pressing.

DETAILED DESCRIPTION OF THE INVENTION

Hereinafter, embodiments of this invention will be described in detail with reference to the drawings.

Figure 1:
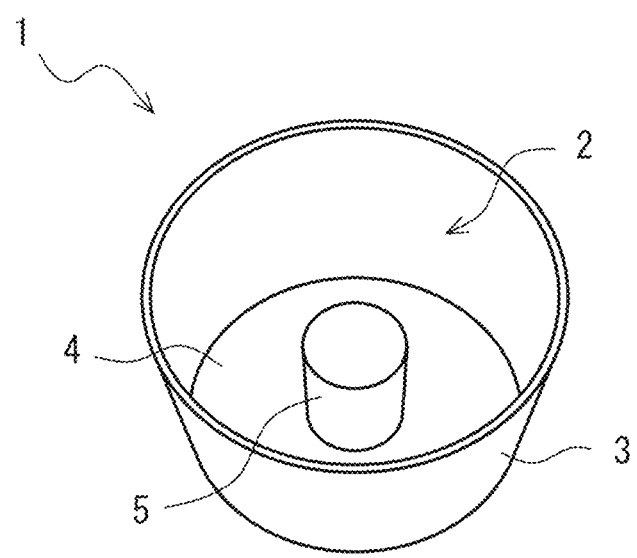
FIG. 1 is a perspective view illustrating an example of a resin mold that can be used in a method for producing a green compact according to an embodiment of the present invention.
Figure 2:
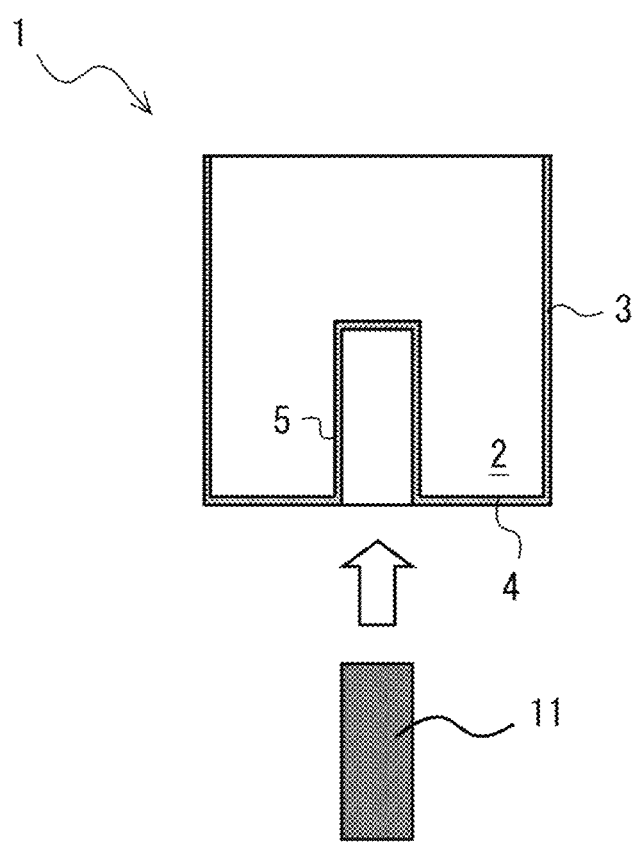
FIG. 2 is a vertical cross-sectional view along a central axis of the mold illustrating the mold of FIG. 1 together with a core material.
Figure 3:
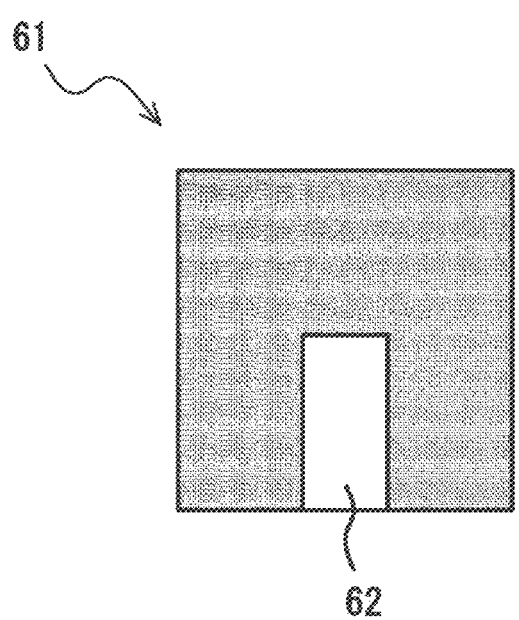
FIG. 3 is a vertical cross-sectional view illustrating a titanium-based green compact produced by using the mold and the core material of FIG. 2.

A method for producing a green compact according to an embodiment of the present invention includes, for example, using a mold 1 and a core material 11 as shown in FIGS. 1 and 2, a step of subjecting a raw material powder in the mold 1 to cold isostatic pressing to produce, for example, a titanium-based green compact 61 made of titanium or a titanium alloy as shown in FIG. 3 or other metallic green compact. The term "metallic" as used herein includes not only pure metals but also alloys. Hereinafter, as an example of the metallic green compacts and sintered bodies, the titanium-based compacts and titanium-based sintered bodies will be described in detail, but each of the configurations described herein or combinations thereof may be applied to the production of other metallic compacts and sintered bodies.

The titanium-based green compact 61 shown in FIG. 3 has a substantially cylindrical shape as a whole, and has a recess 62 presenting a non-through depression shape formed on one end face in an axial direction (the lower end face in FIG. 3), which is depressed into a hollow cylindrical shape from that end face. The mold 1 used in the cold isostatic pressing to produce the titanium-based green compact 61 having such a recess 62 has a forming space 2 having a shape corresponding to the shape of the titanium-based green compact 61.

More particularly, the mold 1 includes: a cylindrical outer cylindrical wall portion 3 having an inner peripheral surface that matches an outer peripheral surface of the titanium-based green compact 61; a circular annular wall portion 4 provided at one end portion (the lower end portion in FIG. 2) of the outer cylindrical wall portion 3; and a cylindrical inner cylindrical wall portion 5 with a bottom at the center. The inner cylindrical wall portion 5 is an end portion on a side with no bottom, and attached to a hole at the center of the annular wall portion 4, and the one end portion of the outer cylindrical wall portion 3 is sealed by those annular wall portion 4 and inner cylindrical wall portion 5.

Here, the inner cylindrical wall portion 5 of the mold 1, which forms the recess 62 to be provided in the titanium-based green compact 61, is arranged with a cylindrical core 11 material inserted as shown by the arrow in FIG. 2 to resist pressure received from the raw material powder in the forming space 2 during cold isostatic pressing.

Figure 4:
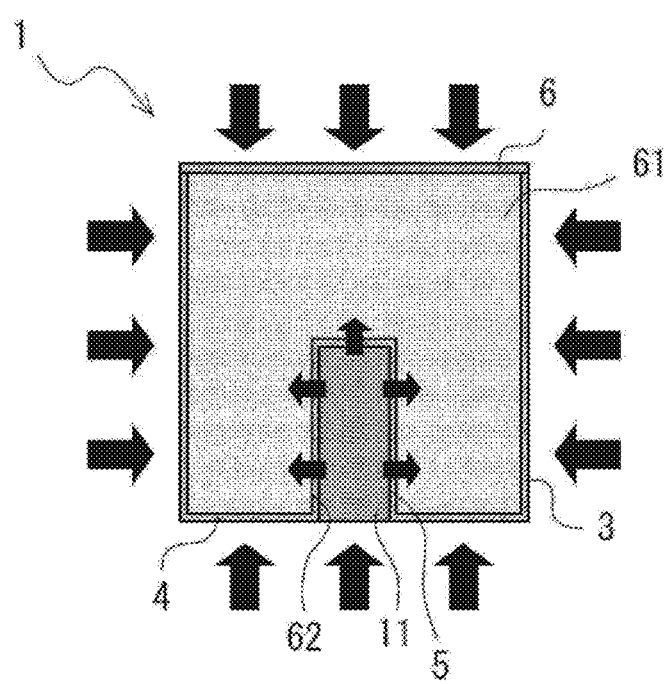
FIG. 4 is a vertical cross-sectional view schematically showing that cold isotropic pressing is carried out using the mold and the core material of FIG. 2.

Then, the forming space 2 in the mold 1 is filled with the raw material powder, and the other end portion of the outer cylindrical wall portion 3 of the mold 1 (the upper end portion in FIG. 4) is sealed with a disk-shaped member 6 as shown in FIG. 4, and cold isostatic pressing (CIP) is carried out inside a cold isostatic pressing device (not shown) by indirectly pressing the raw material powder from the outside of the mold 1 through the mold 1. Here, it should be noted that the disk-shaped member 6 forms a part of the mold 1. By the cold isostatic pressing, the raw material powder in the mold 1 is pressed and compacted to form the titanium-based green compact 61.

An applied pressure to the raw material powder in the cold isostatic pressing is, for example, 200 MPa or more, typically 400 MPa or more. In addition, the applied pressure may be 600 MPa or less, typically 500 MPa or more. Further, a holding time at such an applied pressure may be, for example, from 0.5 to 30 minutes.

Figure 5:
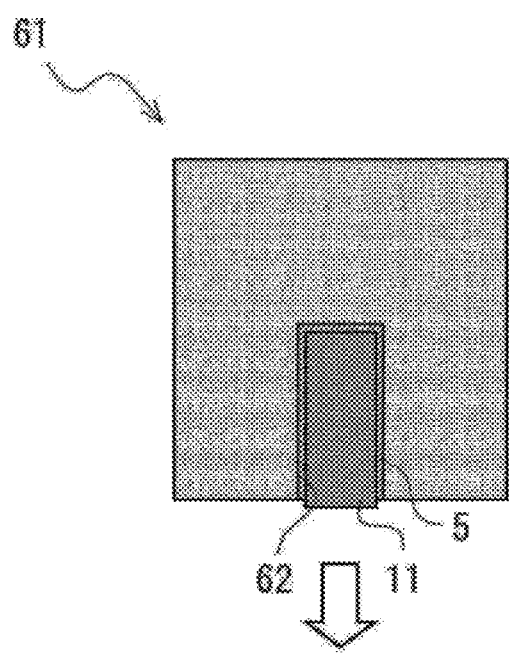
FIG. 5 is a vertical cross-sectional view illustrating a titanium-based green compact obtained by the cold isotropic pressing of FIG. 4 in a state before removing a part of the core material and the mold.

After pressing by the cold isostatic pressing, the resulting titanium-based green compact 61 is removed from the cold isostatic pressing device together with the mold 1 and the core material 11, and the outer cylindrical wall portion 3, the annular wall portion 4, and the disk-shaped member 6 around the titanium-based green compact 61 are removed. Subsequently, as shown in FIG. 5, the core material 11 and the inner cylindrical wall portion 5 in the recess 62 of the titanium-based green compact 61 are removed. The core material 11 may be taken out before removing the outer cylinder wall portion 3 and the like. Thus, the titanium-based green compact 61 can be produced.

Figure 6:
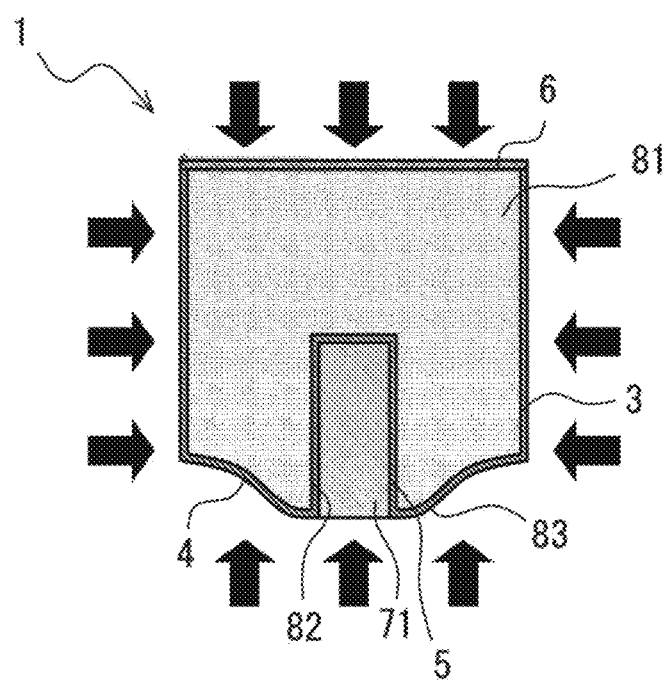
FIG. 6 is a vertical cross-sectional view schematically showing that cold isotropic pressing is carried out in a method for producing a green compact using a metal core material.

In carrying out such cold isostatic pressing, if a core material 71 made of a metal such as steel is inserted and placed into the inner cylindrical portion 5 of the mold 1 as shown in FIG. 6, the present inventors believe that the following problems will be caused. In the mold 1 as shown in FIG. 6, the metallic and highly rigid core material 71 does not substantially undergo elastic deformation when the volume of the raw material powder inside the mold 1 gradually decreases due to the applied pressure. Therefore, when the highly rigid core material 71 is used, it is difficult to transmit the applied pressure to the raw material powder through the core material 71, and the way of transmitting the applied pressure may differ between the region near the core material 71 and the region away from the core material 71. In particular, the applied pressure is not transmitted in the radial direction of the core material 71, and the applied pressure is not sufficiently transmitted to the raw material powder located around the core material 71. This results in insufficient compaction of the raw material powder located around the core material 71 as compared to the raw material powder located on the periphery of the core material 71. As exaggeratedly shown in FIG. 6, for the resulting titanium-based green compact 81, the surface of the mold 1 on the annular wall portion 4 side is raised around the core material 71 at a surface portion of the mold 1 near the core material 71, where a raised portion 83 is formed.

To address those problems, this embodiment uses a resin core material 11 in place of the metallic core material 71. When the resin core material 11 is compressed in the axial direction by the applied pressure acting in the axial direction of the mold 1 during the cold isostatic pressing, the core material 11 also transmits the applied pressure in the radial direction, as shown in FIG. 4. This can allow the raw material powder around the core material 11 to be also sufficiently compacted, thereby suppressing the rising on the surface portion around the core material 11 in the titanium-based green compact 61. In addition, after unloading, the core material 11 can be restored by protruding from the recess 62. Therefore, the use of the resin core material enables the production of titanium-based green compact having good dimensional accuracy. This is also the case when a metallic raw material powder other than titanium or a titanium alloy is used to produce a metallic compact other than the titanium-based green compact 61, and a metallic green compact having good dimensional accuracy can be obtained.

The resin core material 11 is preferably made of a resin material having a stress of from 0.3 MPa to 3.5 MPa at a 20% strain in a uniaxial compression test. The core material 11 made of the resin material having the stress of 0.3 MPa to 3.5 MPa at the 20% strain is more appropriately compressed during the cold isotropic pressing, and the pressure is more appropriately transmitted to the raw material powder. From this point of view, the core material 11 is preferably made of a resin having a stress of from 0.3 to 2.0 MPa at the 20% strain, and more preferably a stress of from 0.4 MPa to 0.8 MPa.

The measurement of the stress of the core material 11 at the 20% strain is carried out by applying a uniaxial pressure to a resin sample having a diameter of 10 mm and a height of 10 mm at a rate of 1 mm/min in the height direction of the resin sample, and measuring the stress when the strain (a decrease in height of the resin sample) has reached 20%. The uniaxial compression test may use a 5565 type material tester from Instron.

Specifically, the core material 11 is suitably contain at least one selected from the group consisting of silicone resins, chloroprene resins, and fluoro resins. Among them, it is more suitable to contain at least one selected from the group consisting of silicone resins and fluoro resins. When the core material 11 containing at least one of these resins is used, the titanium-based green compact 61 having a particularly improved dimensional accuracy can be obtained.

The core material 11 containing the silicone resin or the fluoro resin can be easily removed from the inner cylindrical wall portion 5 of the mold 1 after the cold isostatic pressing. This is particularly desirable in achieving easy and efficient production of the titanium-based green compact 61. When a silicone sealant is used as the silicone resin, it is in the form of gel or the like and exhibits fluidity when filled into the inner cylindrical wall portion 5 of the mold 1. Therefore, it also has an advantage of facilitating the formation of the recess 62 with high accuracy even if the recess 62 has a complicated shape. In the case of using the silicone sealant, it is suitable to fill the sealant in the form of the gel in the inner cylindrical wall portion 5 of the mold 1, leave it for a certain period of time to solidify, and then carry out the cold isostatic pressing.

It should be noted that the resin core material 11 may be any material as long as it can be inserted or filled into the inner cylindrical wall portion 5 and properly compressed during the cold isostatic pressing, and can also be deformed in a direction of coming out of the recess 62 without affecting the titanium-based green compact 61 upon unloading.

The resin mold 1 is preferably made of a thermoplastic resin. The resin mold 1 is particularly suitable to be made of an acrylic resin, an acrylic resin containing an elastomer, a polylactic acid (PLA) resin, or the like. The resin mold 1 is preferably made of a thermoplastic resin having a Shore D hardness in a range of from 30 to 120, in order to ensure the required strength and to maintain its shape during filling with the raw material powder, and may be a thermoplastic resin having a Shore D hardness in a range of from 30 to 85. The Shore D hardness can be measured by a test method in accordance with JIS K 7215 (1986). From the same point of view, the resin mold 1 may have a thickness of from 0.5 mm to 2.0 mm.

The resin mold 1 can be produced by various methods, but the use of a 3D printer is preferable because it is easy to produce molds 1 having various shapes.

When producing the titanium-based sintered body made of titanium or a titanium alloy, it includes a step(s) of subjecting the titanium-based green compact 61 to sintering and/or hot isostatic pressing (HIP), after the cold isostatic pressing.

In the sintering, the titanium-based green compact 61 can be heated at a temperature of 1200° C. to 1300° C. for 1 hour to 3 hours, for example, depending on the material of the titanium-based green compact 61. In the hot isostatic pressing, for example, an isostatic pressure of about 100 MPa to about 200 MPa is applied to the titanium-based green compact 61 at a temperature of 800° C. to 1000° C. for 30 minutes to 90 minutes using a pressure medium such as argon gas. This can allow for the production of the titanium-based sintered body. In the hot isostatic pressing, the sintering generally progresses due to the high temperature treatment. Therefore, the titanium-based sintered body is also referred to as a titanium-based sintered body even if it is obtained by only subjecting the titanium-based compact to the hot isostatic pressing. When both the sintering and the hot isostatic pressing are carried out, the order is not particularly important, but for example, the hot isostatic pressing can be carried out after the sintering.

As described above, the description has been made for the case where the cold isostatic pressing is carried out while the core material 11, which is a separate member from the mold 1, is arranged at a portion in the inner cylinder wall portion 5 of the mold 1, which corresponds to the recess 62, with the inner cylindrical wall portion 5, which is a wall portion of the mold 1, sandwiched between the core material 11 and the raw material powder.

Figure 7:
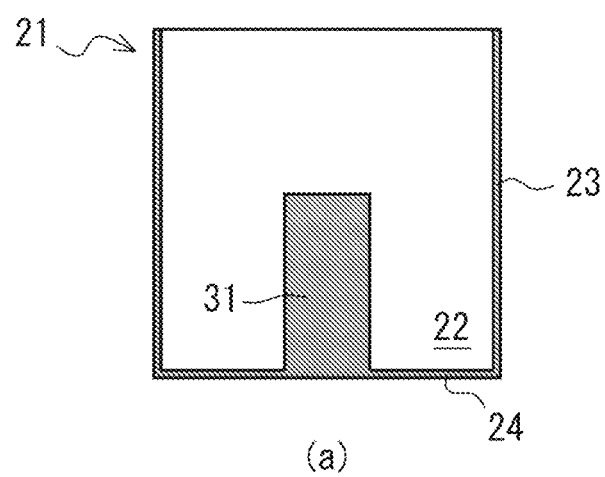
FIG. 7: each of (a) and (b) is a vertical cross-sectional view illustrating other example of a resin mold and a core material.
Figure 7:
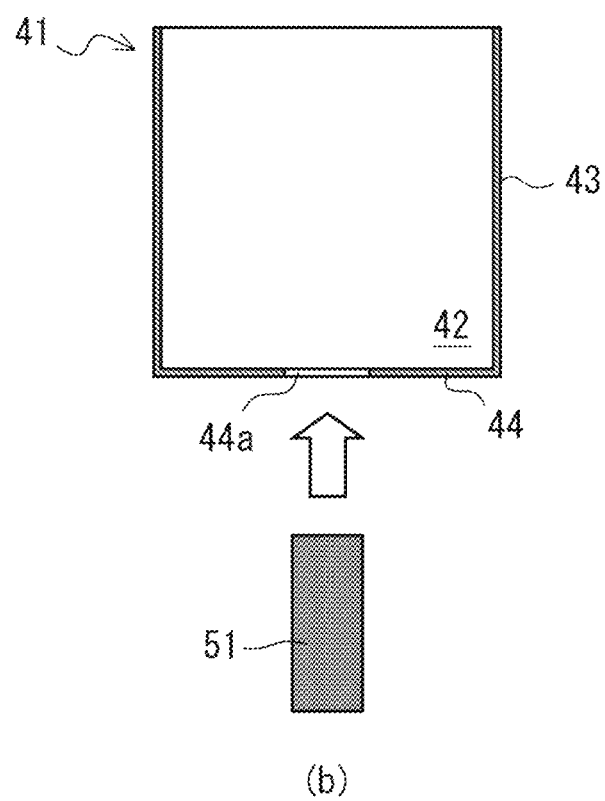

On the other hand, as shown in FIG. 7 (*a*), a core material 31 may be integrally formed with a mold 21. More particularly, the mold 21 is provided with a cylindrical core material 31 integrally attached to the center of the annular wall portion 24 provided at one end portion (the lower end portion in FIG. 7) of the outer cylindrical portion 23. In this example, the portion corresponding to the inner cylindrical wall portion 5 of the mold 1 in FIGS. 1 and 2 is also formed of the core material 31 integrated with the annular wall portion 24. Even in such a case, the formation of the raised portion on the titanium-based green compact can be suppressed by making the core material 31 of the resin, as described above. However, as for a degree of freedom in restoring the core material after unloading, the mold where the core material 11 is inserted into the inner cylindrical wall portion 5 of the mold 1 as shown in FIGS. 1 and 2 is superior.

Alternatively, as shown in FIG. 7(*b*), there may be no portion corresponding to the inner cylindrical wall portion 5 in the mold 1 of FIGS. 1 and 2. In the mold 41 with a hole 44a formed at the center of the annular wall portion 44, a cylindrical core material 51 as a separate member may be inserted into the hole 44a and subjected to cold isostatic pressing. In this case, the raw material powder to be filled into the forming space 42 of the mold 41 will be in direct contact with the core material 51. Even in the case shown in FIG. 7(*b*), if the core material 51 is made of the resin, the above effect of suppressing the raised portion of the titanium-based compact can be obtained.

Figure 8:
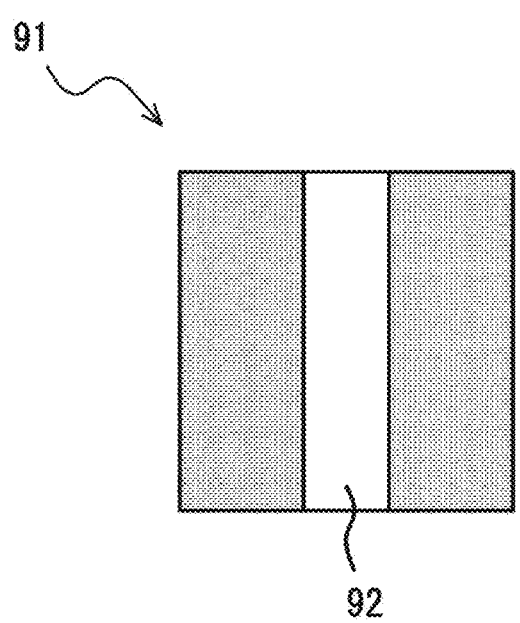
FIG. 8 is a vertical cross-sectional view illustrating a titanium-based green compact that can be produced by using a method for producing a green compact according to another embodiment.

By the way, the production method of this embodiment according to this invention can also be used to produce a metallic green compact such as a titanium-based green compact 91 having at least one through-hole recess 92 as illustrated in FIG. 8. The titanium-based green compact 91 is the same as the titanium-based green compact 61 shown in FIG. 3, with the exception that the recess 92 is in the form of the through-hole that penetrates between the end faces in the axial direction.

As described above, the recess may be in the form of the through hole or a depression with a bottom. Also, the shape of the recess is not limited to a cylindrical shape as shown in the figure, but it may be various complicated shapes. The number of recesses in the produced green compact may be one or plural of two or more. In the case of a plurality of recesses, it is preferable that one or more of the recesses are formed by the method described above to suppress the raised portions.

When producing the titanium-based green compact or titanium-based sintered body by the method described above, various powders such as pure titanium powder, alloy element powder, and base alloy powder can be used in combination as the raw material powder, as needed. The term "pure titanium powder" as used herein refers to a powder consisting essentially only of titanium, the term "alloy element powder" refers to a powder containing a single element such as a titanium alloy, and the term "base alloy powder" refers to a powder containing a plurality of alloy elements. For example, the raw material powder can be only the pure titanium powder, or the pure titanium powder can be mixed with one alloy element powder selected from the group consisting of iron, aluminum, vanadium, zirconium, tin, molybdenum, copper, and nickel, and/or a base alloy powder of two or more of them. Alternatively, a powder containing titanium and alloy elements can be used as the raw material powder. The term "pure titanium" refers to titanium having a titanium content of 99% by mass or more. The mass ratio of metals in the raw material powder can be titanium:alloy element=100:0 to 75:25, or titanium:alloy element=90:10.

When producing a green compact made of a metal other than titanium or titanium alloy, a raw material powder made of a material suitable for the metal is used.

For example, when producing an iron-based green compact made of pure iron or an iron alloy, a pure iron powder and, if necessary, an alloy element powder, base alloy powder or the like can be used as the raw material powder. The alloy elements that can be contained in the alloy element powder and base alloy powder include at least one selected from the group consisting of copper, nickel, carbon, chromium, molybdenum, sulfur, manganese, nitrogen, titanium, zirconium, niobium, and phosphorus. When producing the green compact or sintered body made of the iron alloy, the mass ratio of metals in the raw powder can be iron:alloy element=100:0 to 50:50, or even 100:0 to 70:30.

Alternatively, when producing a molybdenum-based compact made of pure molybdenum or a molybdenum alloy, a pure molybdenum powder and, if necessary, an alloy element powder, a base alloy powder or the like can be used as the raw material powder. Here, the alloy elements that can be contained in the alloy element powder and base alloy powder include at least one selected from the group consisting of titanium, zirconium, tungsten and copper. When producing the green compact or sintered body made of the molybdenum alloy, the mass ratio of the metals in the raw powder can be molybdenum:alloy element=100:0 to 50:50, or even 100:0 to 70:30.

The raw material powder preferably has an average particle size of from 10 μm to 150 μm. The use of such relatively fine particles can improve the compressive density of the green compact after cold isostatic pressing and also the sintered body after sintering or hot isostatic pressing. The average particle size refers to a particle size D50 (median diameter) of the particle size distribution (volume basis) obtained by laser diffraction scattering.

Known powders such as milled and atomized powders can be used as the raw material powder.

The use of such raw material powders can be used to produce the titanium-based green compact made of pure titanium, or the titanium-based green compact made of a titanium alloy consisting of Ti-5Al-1Fe, Ti-5Al-2Fe, Ti-6Al-4V, Ti-6Al-6V-2Sn, Ti-6Al-2Sn-4Zr-2Mo, Ti-6Al-2Sn-4Zr-6Mo or Ti-10V-2Fe-3Al, or the like, and the titanium-based sintered body. As used herein, the number marked in front of each alloy metal refers to the content (% by mass). For example, "Ti-6Al-4V" refers to a titanium alloy containing 6% by mass of Al and 4% by mass of V as alloy metals.

EXAMPLES

Next, the method for producing the green compact according to this invention was experimentally conducted and its effects were confirmed as described below. However, the description herein is merely for the purpose of illustration and is not intended to be limited thereto.

Test Example 1

Figure 9:
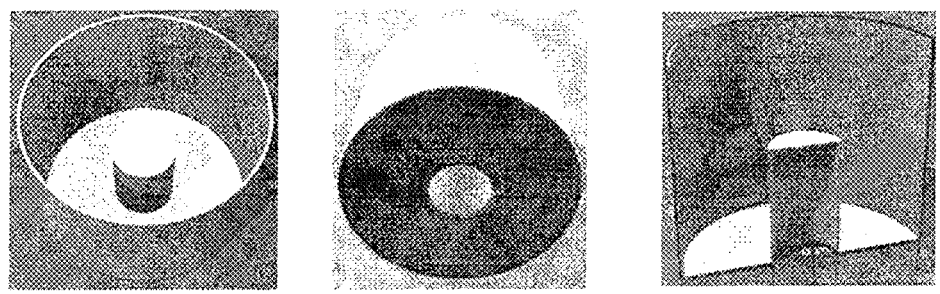
FIG. 9 is a view showing shaping data of a 3D printer used in Test Example 1 of Examples.

Based on the shaping data as shown in FIG. 9, a mold made of polylactic acid (PLA) (shore D hardness: 83) and a mold made of an elastomer-containing acrylic resin (shore D hardness: 34) were shaped using a 3D printer for resins. Each mold has a thickness of 1.0 mm, an inner diameter of the outer cylinder wall portion of 80 mm, its inner height of 70 mm, and an inner height of the inner cylindrical wall portion of 40 mm. A plurality of molds having constant dimensions and different outer diameters of the inner cylindrical wall portions in a range of from 10 mm to 50 mm were prepared and used for the test.

In Example 1, a cylindrical core material made of a silicone rubber (silicone resin) was used as the core material provided in the inner cylindrical wall portion of the mold. In Example 2, a cylindrical core material made of a fluoro polymer (fluoro resin) was used. In Example 3, a cylindrical core material made of a chloroprene rubber (chloroprene resin) was used. In Example 4, a silicone sealant (silicone resin) was injected into the inner cylindrical wall portion and cured into a cylindrical shape in the inner cylindrical wall portion. In Example 5, a core material was made of a polylactic acid that was the same material as that of the mold, and the core material was integrally formed with the inner cylindrical wall portion of the mold.

In each of Examples 1 to 5, a mold made of polylactic acid (PLA) was used. Example 6 was the same as Example 4 with the exception that a mold made of an acrylic resin containing an elastomer was used.

In Comparative Example 1, an alumina core material was used. In Comparative Example 2, a core material made of tungsten carbide was used. In Comparative Example 3, a core material made of carbon steel (S45C) was used. In each of Comparative Examples 1 to 3, a mold made of polylactic acid (PLA) was used. Since the core materials used in Comparative Examples 1 to 3 have high hardness, the uniaxial compression test was not conducted.

For each of Examples 1 to 6 and Comparative Examples 1 to 3 as described above, pure titanium HDH powder having an average particle size of 80 μm (titanium content of 99.9% by mass, TC-150 from TOHO TECHNICAL SERVICE CO., LTD.) as the raw material powder was filled in the mold, which was subjected to cold isotropic pressing at 490 MPa for 1 min. After the cold isotropic pressing, the mold and the core material were heated together with the raw material powder therein to 100° C. in an electric furnace, and the mold was released with pliers or the like to obtain a titanium-based green compact.

In each of Examples 1 to 6 and Comparative Examples 1 to 3, the raw material powder was compacted by the cold isotropic pressing, and a titanium-based green compact could be produced.

Further, the surface of each titanium-based green compact obtained by the cold isotropic pressing was visually confirmed on the annular wall portion side of the mold. Table 1 shows the results as to whether or not the surface portion of the surface near the inner peripheral side, which is the core material side, is raised as compared with the surface portion on the outer peripheral side.

TABLE 1

| Outer Diameter of Inner Cylindrical Wall Portion of Mold (mm) | Example 1 (Silicone Rubber) | Example 2 (Fluoropolymer) | Example 3 (Chloroprene Rubber) | Example 4 (Silicone Sealant) | Example 5 (Polylactic Acid, Integrated with Mold) |
|---|---|---|---|---|---|
| 10 | Not Raised | Not Raised | Not Raised | Not Raised | — |
| 20 | — | — | — | Not Raised | Not Raised |
| 30 | — | — | — | Not Raised | — |
| 40 | — | — | — | Not Raised | — |
| 50 | — | — | — | Not Raised | — |

| Outer Diameter of Inner Cylindrical Wall Portion of Mold (mm) | Example 6 (Silicone Sealant, Mold Material Changed) | Comparative Example 1 (Alumina) | Comparative Example 2 (Tungsten Carbide) | Comparative Example 3 (Carbon Steel) |
|---|---|---|---|---|
| 10 | Not Raised | Raised | Raised | Raised |
| 20 | — | Raised | — | Raised |
| 30 | — | Raised | — | — |
| 40 | — | — | — | — |
| 50 | — | — | — | — |

A uniaxial compression test was conducted on a sample of each resin material of the core material as described above. As a result, the stress at 20% strain was 0.6 MPa for the silicone rubber of Example 1, 1.6 MPa for the fluoro polymer of Example 2, and 1.1 MPa for the chloroprene rubber of Example 3. Each of the silicone sealants of Examples 4 and 6 was subjected to the uniaxial compression test after being cured, and as a result, the stress at 20% strain was substantially the same as that of the silicone rubber of Example 1.

As can be seen from Table 1, it was confirmed that no raised portion was generated in Examples 1 to 6, whereas the raised portion was generated in Comparative Examples 1 to 3.

It was also confirmed whether or not the core material could be easily removed from the recess of each titanium-based green compact after being subjected to the cold isotropic pressing and before being heated in the electric furnace. The results are shown in Table 2. Table 2 shows the number of times (in fractions) that could easily remove the core material in the two or three productions of each titanium-based green compact.

TABLE 2

| Outer Diameter of Inner Cylindrical Wall Portion of Mold (mm) | Example 1 (Silicone Rubber) | Example 2 (Fluoropolymer) | Example 3 (Chloroprene Rubber) | Example 4 (Silicone Sealant) | Example 5 (Polylactic Acid, Integrated with Mold) |
|---|---|---|---|---|---|
| 10 | 2/3 | 3/3 | 0/3 | 3/3 | — |
| 20 | — | — | — | 3/3 | 0/3 |
| 30 | — | — | — | 3/3 | — |
| 40 | — | — | — | 3/3 | — |
| 50 | — | — | — | 2/2 | — |

| Outer Diameter of Inner Cylindrical Wall Portion of Mold (mm) | Example 6 (Silicone Sealant, Mold Material Changed) | Comparative Example 1 (Alumina) | Comparative Example 2 (Tungsten Carbide) | Comparative Example 3 (Carbon Steel) |
|---|---|---|---|---|
| 10 | 3/3 | 0/3 | 0/2 | 0/3 |
| 20 | — | 0/3 | — | 0/2 |
| 30 | — | 0/3 | — | — |
| 40 | — | — | — | — |
| 50 | — | — | — | — |

As shown in Table 2, the core material could be easily removed for the silicone rubber of Example 1, the fluoropolymer of Example 2, and the silicone sealants of Examples 4 and 6. This would be because the core materials made of those resins are deformed when the core material is pulled upon removal, thereby reducing the adhesion of the mold to the core material and reducing the frictional force.

On the other hand, it was difficult to remove the core material from the recess of each titanium-based green compact for the materials containing the chloroprene rubber of Example 3, the polylactic acid integrated with the mold of Example 5, and the metals of Comparative Examples 1 to 3. This would be because, in each of Comparative Examples 1 to 3, the core material is harder, so that the core material is not deformed upon removal and the friction is increased, resulting in difficulty to be removal. In each Example 3 and Example 5, the core material was torn off at the time of removal, resulting in difficulty to be removed.

Test Example 2

Figure 10:
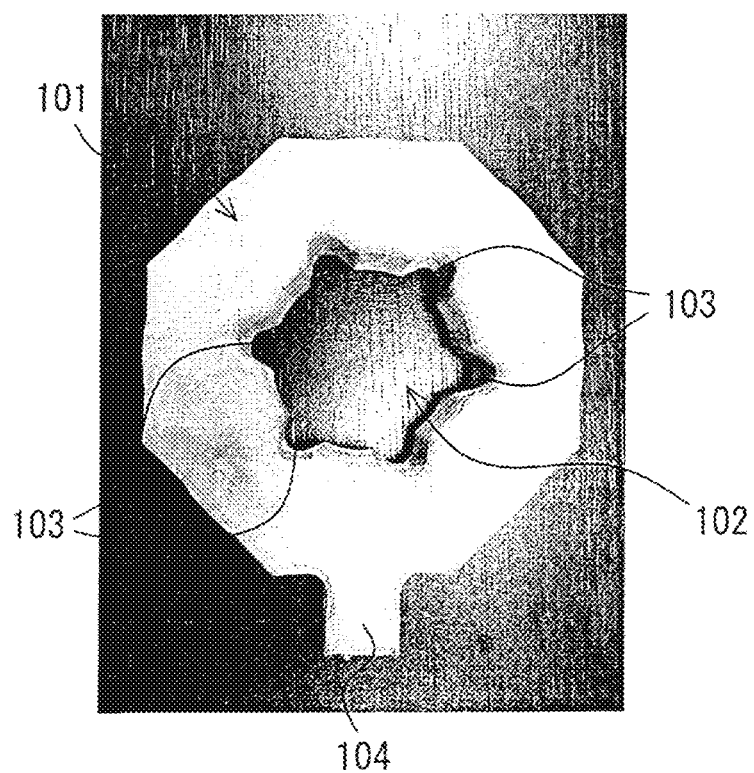
FIG. 10 is a photograph of a titanium-based green compact produced in Test Example 2 of Examples.

A titanium-based green compact 101 having a complicated shape as shown in FIG. 10 was produced. The titanium-based green compact 101 has an annular shape as a whole in which an outer contour shape of a cross section along a direction perpendicular to a central axis is substantially regular octagon, and in which the same cross section of the central recess 102 has six semi-circular depression portions 103 on the circumference of the circle at equal intervals in a direction toward the outer peripheral side. The outer peripheral surface corresponding to one side of the regular octagon of the outer contour shape is provided with a rectangular parallelepiped protruding portion 104 extending from the outer peripheral surface to the outer peripheral side. From the portion where the protruding portion 104 was formed, the HDH powder made of pure titanium having an average particle size of 80 μm (titanium content of 99.9% by mass, TC-150 from TOHO TECHNICAL SERVICE CO., LTD.) as a raw material powder was filled in the mold.

The mold used for producing the titanium-based green compact 101 was made of polylactic acid (PLA) produced by a 3D printer for resins, and its shore D hardness was 83. The mold corresponding to the shape of the titanium-based green compact 101 has a length of one side of the regular octagon in the cross section of the outer cylindrical wall portion of 55 mm, and a height in the direction along the central axis of the outer cylindrical wall portion of 30.5 mm, and dimensions of the portion corresponding to the protruding portion 104 of 25 mm in length and 25 mm in width.

Further, in the inner cylindrical wall portion of the mold, six recesses each having a substantially semicircular cross section having a diameter of 4.6 mm corresponding to each depression portion 103 are formed at equal intervals in the circumferential direction on the outer surface of the cylinder having an outer diameter of 31.7 mm. The core material arranged in the inner cylinder wall portion to form the recess 102 was made of the silicone sealant.

Such a mold and core material could allow the titanium-based green compact 101 shown in FIG. 10 to be produced. Therefore, it was found that according to this invention, the titanium-based green compact having the complicated shape could also be well produced.

Test Example 3

Each green compact according to each of Examples 7 to 9 was produced under the same conditions as those of Example 4 in Test Example 1 as described above, with the exception that the material of the raw material powder was changed, Example 7 produced a green compact made of Ti-6Al-4V (titanium 64 alloy), Example 8 produced a green compact made of pure iron (Fe), and Example 9 produced a green compact made of pure molybdenum (pure molybdenum) (Mo). In each of Examples 7 to 9, a mold having an outer diameter of the inner cylinder wall portion of 10 mm was used.

As a result, in each of the green compacts according to Examples 7 to 9, the surface portion near the inner peripheral side (on core material side) on the surface located on the annular wall portion side of the mold was not raised. Therefore, it was found that even if the green compact was made of a material other than pure titanium, it was possible to suppress the generation of the raised portion on the surface of the green compact near the core material.

DESCRIPTION OF REFERENCE NUMERALS

1, 21, 41 mold
2, 22, 42 forming space 3, 23, 43 outer cylindrical wall portion
4, 24, 44 annular wall portion
44a hole
5 inner cylindrical wall portion
6 disc-shaped member
11, 31, 51, 71 core material
61, 81, 91, 101 titanium-based green compact
62, 82, 92, 102 recess
83 raised portion
103 depression portion
104 protruding portion

The invention claimed is:

1. A method for producing a metallic green compact having at least one recess, wherein the method comprises a step of subjecting a raw material powder filled in a resin mold to cold isostatic pressing while placing a resin core material having a shape corresponding to the recess at a position corresponding to the recess in the resin mold, wherein the method uses a core material made of a resin material having a stress of 0.3 MPa to 3.5 MPa at a 20% strain in a uniaxial compression test, as the core material,
   wherein the method uses a mold made of a thermoplastic resin having a Shore D hardness in a range of from 30 to 120 as the mold, and
   wherein after unloading of a pressure in the cold isostatic pressing, the core material is restored by protruding from the recess while the core material is placed in the position corresponding to the recess in the resin mold, and
   wherein the cold isostatic pressing is carried out while the core material, as a separate member from the mold, is placed at a position corresponding to the recess of the mold, with a wall of the mold sandwiched between the core material and the raw material powder.

2. The method according to claim 1, wherein the core material comprises at least one selected from the group consisting of silicone resins and fluoro resins.

3. The method according to claim 1, wherein the recess is in a form of a through-hole or a non-through depression.

4. The method according to claim 1, wherein a titanium-based green compact made of titanium or a titanium alloy is produced as the green compact.

5. The method according to claim 1, wherein an iron-based compact made of iron or an iron alloy is produced as the green compact.

6. The method according to claim 1, wherein an applied pressure to the raw material powder in the cold isostatic pressing is 200 MPa or more.

7. The method according to claim 1, wherein the mold has a thickness of from 0.5 mm to 2.0 mm.

8. The method according to claim 1, wherein the mold is produced using a 3D printer.

9. The method according to claim 1, wherein the raw material powder has an average particle size of from 10 μm to 150 μm.

10. The method according to claim 1, wherein the core material is formed by a silicone sealant.

11. A method for producing a sintered body, wherein the method comprises a step of subjecting the green compact produced by the method for producing the green compact according to claim 1 to sintering and/or hot isostatic pressing.

* * * * *